UNITED STATES PATENT OFFICE.

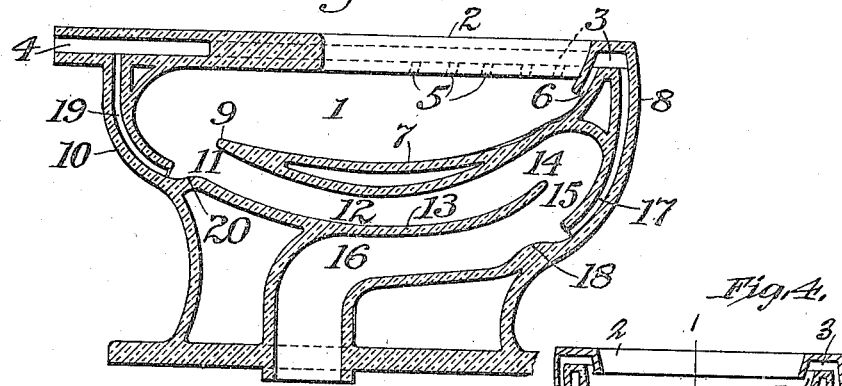
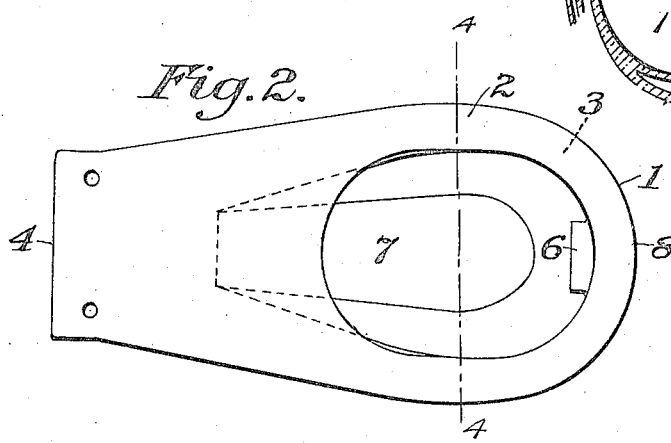
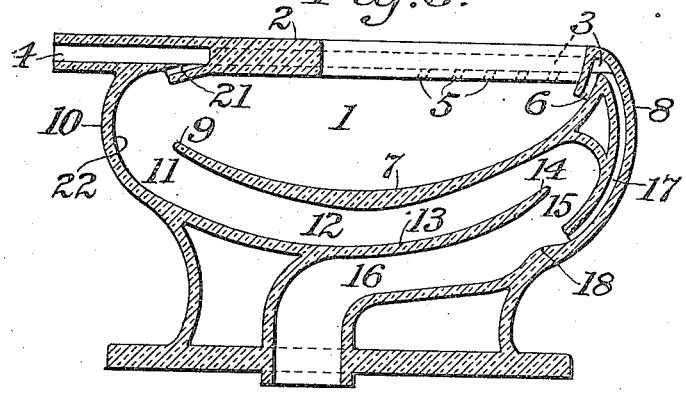

HARRISON TAYLOR CRONK, OF NEW YORK, N. Y., ASSIGNOR TO CRONK-SALTER COMPANY, OF NEW YORK, N. Y., A CORPORATION OF NEW YORK.

SIPHON-BOWL.

1,301,821.  Specification of Letters Patent.  Patented Apr. 29, 1919.

Application filed January 26, 1914. Serial No. 814,278.

*To all whom it may concern:*

Be it known that I, HARRISON TAYLOR CRONK, a citizen of the United States, residing in the city, county, and State of New York, have invented certain new and useful Improvements in Siphon-Bowls, of which the following is a specification.

My invention relates to water-closet bowls of the unitary trap class and an object of the invention is to provide a bowl and trap which will be effectively flushed with a minimum amount of flushing fluid and which is particularly designed for installation where conservation of water is desired.

It has been usual with a certain class of devices of this character to introduce a projection into the discharging limb of the siphon which extends from the trap, to break the column of water passing therethrough into a spray and thus form a seal to prevent the air from coming up from below; at the same time a portion of the air above the projection is carried down by the large mass of falling water and the air at this place is thus rarefied so that the atmospheric pressure at the entrance of the trap forces the material over the dam at the end of the trap adjacent the outlet therefrom. But the successful operation of devices of this class depends upon a large body of water falling vertically down a material distance so that the intercepting projections are necessarily spaced from the dam and naturally in these devices economy in the use of flushing fluid was not attained.

This invention consists in forming the rarefication as close to the dam as possible and in forming this reduction in atmospheric pressure by the action of a relatively small flow of flushing fluid independent of the main refuse carrying stream.

This invention further consists in siphoning the material from the open refuse receiving member or bottom below the hole in the seat, into the trap either with or without the feature of siphoning the material from the trap.

Various other objects will be in part obvious from the two forms of the invention illustrated in the drawing and will be in part more fully set forth in the following description of these two forms.

In the accompanying drawings:

Figure 1 is a longitudinal vertical sectional view taken centrally through a preferred embodiment of my invention and taken on the line 1—1 of Fig. 4;

Fig. 2 is a plan view looking down upon the device shown in Fig. 1;

Fig. 3 is a view similar to Fig. 1 showing a slightly modified form of construction, and Fig. 4 is a transverse sectional view taken on the line 4—4 of Fig. 2 and showing the upper portion of the bowl.

In the drawings is shown a closet bowl 1 having a seat 2 preferably in the form of a hollow rim constituting a flushing water conduit 3. Water or other flushing fluid is led preferably from the rear of the bowl through the main inlet 4 to the conduit 3 and is fed therefrom through relatively small inlets 5 on opposite sides of the front portion of the bowl, through the main forward fluid inlet 6 and through the other inlets hereinafter described.

The bowl has a refuse receiving bottom 7 in the form of a substantially horizontal slightly concaved ledge extending in a long sweeping curve from adjacent the front wall 8 to a position in rear of the seat opening to form a receiving well for the refuse material. This bottom preferably has one side of the front portion slightly higher than the opposite side and in general, this much of the upper portion of the bowl resembles the construction disclosed in my Patent No. 1,129,826, dated Feb. 23, 1915.

The rear edge 9 of this bottom 7 constitutes a dam for the receiving well and terminates in position spaced from the rear wall 10 so as to provide an inlet 11 to the trap 12 which is formed by a relatively long concave ledge 13 extending forwardly from the rear wall 10, spaced beneath and paralleling the bottom 7. The cross-sectional area of the trap is gradually reduced from its opposite ends toward its center thereby to choke the passage of the fluid through the dam intermediate its inlet and outlet.

The front edge 14 of the ledge 13 forms a dam for the outlet end of the trap and terminates in position spaced from the front wall to form the entrance 15 to the inverted substantially L-shaped passageway 16 which forms the lower limb of the second siphon, the other limb of which is the trap itself. The front wall has a downwardly and inwardly curved passageway 17 leading from the conduit 3 to a position slightly within the entrance 15. Positioned within this entrance and adjacent the outlet of the passageway 17 thereto is a raised deflecting projection 18 constituting a constriction in the lower limb of the siphon.

Referring to the form shown in Fig. 1, a rear passageway 19 resembling the passageway 17 leads toward a projection 20 similar to the projection 18, which is positioned slightly within the trap adjacent the inlet 11.

Referring particularly to the form illustrated in Fig. 3 an auxiliary fluid opening 21 from the conduit 3 directs the fluid rearwardly about the inner curved face 22 of the rear wall 10 from which it is directed into the trap 12.

In operation, the refuse matter is dumped into the shallow well in the bottom 7 and by means of some suitable control the flushing fluid is admitted through the main inlet 4 to the conduit 3. A main flushing stream will flow into the bowl through the inlet 6 and small opening 5 and will be given a whirling sweeping movement over the dam 9 carrying with it all refuse material, both heavy and floating. Simultaneously with this action, in the form shown in Fig. 1, the stream from the rear inlet 19 meets the projection 20 and carries the air just within this inlet and in advance of the main stream whirled from the bottom 7, so that at this point there is, in addition to the sweeping of refuse off the ledge, a suction action drawing this refuse material into the trap and it is obvious that the bowl may be so constructed and operated without the addition of any particular siphoning action from the trap.

The relatively small stream of flushing fluid through the passageway 17 forms a rarefication of the air adjacent the dam 14 and starts a siphonic action drawing the refuse material from the trap 12 and causing the same to flow out through the passageway 16. There is thus formed a means for first drawing the refuse material from the open top ledge 7 into and from the trap 12 and then through the outlet passageway 16.

In the modification shown in Fig. 3, the back action of the stream of flushing fluid from the opening 21, which is directed around the curved wall 22, meets the whirling mass of refuse material from the bottom 7 and curves the axis of this whirling mass downwardly and forwardly into the trap from which it is withdrawn as hereinbefore described.

It is noted by this construction that the refuse material is drawn as well as pushed off the receiving ledge into the trap. The reduction of atmospheric pressure adjacent the dams by the supplemental streams of water eliminates the necessity of a depending column of heavy mass and accordingly economizes in the use of flushing fluid. By means of this construction it is not necessary to initially pass a large mass of the refuse material before the rarefication is established for the small stream in advance of the refuse carrying body of fluid has a sufficient volume to cause a rarefication sufficient to start the siphonic action.

Although I have shown only one form of mechanism embodying my invention, it is obvious that various changes within the skill of the mechanic may be made therein without departing from the spirit of the invention, provided the means set forth in the following claims are employed.

Having thus described my invention, I claim.

1. A closet bowl comprising a pair of superposed, relatively long, similarly shaped and slightly concave refuse receiving ledges forming a relatively shallow trap therebetween, and each having a sharp edge constituting a dam, and said dams being disposed at opposite ends of the ledges, rounded side walls curving downwardly and inwardly respectively into each ledge at the ends thereof opposite the dams, means for directing a flushing fluid down each of said rounded walls, an outlet from said trap and means for siphoning the material from said trap.

2. A closet bowl comprising a pair of superposed, concave refuse receiving ledges, forming a horizontally disposed, relatively long trap therebetween and each having a free edge constituting a dam, and said dams being disposed at opposite ends of the ledges, rounded side walls curving downwardly and inwardly with a long substantially horizontal curve respectively into each ledge at the ends thereof opposite the dams, means for directing a flushing fluid down each of said rounded walls and means for drawing the fluid from the dam.

3. A closet bowl comprising a refuse receiving bottom, a trap in fluid communication with said bottom, an outlet from said trap, means for sweeping the refuse material from said bottom into said trap with a whirling action, said means including a portion of said bottom raised slightly from the adjacent portion, means for siphoning said material from the bottom into the trap and additional means for drawing the refuse material from said trap into said outlet.

4. A closet hopper having a relatively flat bottom with one side slightly higher than the other, side walls curved into said bottom, and said bottom leading to a rear outlet.

5. A closet hopper comprising a substantially flat refuse receiving member having a dam, a horizontally disposed outlet leading from said dam, means for directing a flushing fluid in operative relation to said member to sweep the refuse from said member over said dam into said outlet, other flushing means directed along the bottom of said outlet in the direction of movement of the refuse along said bottom and means coacting with said other flushing means for drawing said refuse into said outlet.

6. In a water closet bowl having three superposed ledges, successively in fluid communication with each other, whereby refuse will flow from the upper to the next succeeding lower ledge, the upper ledge constituting a refuse receiving ledge, the upper ledge and the middle ledge forming a trap therebetween, and the middle ledge and lower ledge forming an outlet from the trap, a water conduit leading to one of said ledges at the end thereof receiving the refuse matter and adapted to direct the water in the direction of flow along the length of the ledge, the middle ledge and the lower ledge having a rounded top water deflecting projection disposed slightly in advance of the inlet of the water to said ledges.

In witness whereof I have hereunto set my hand in the presence of two witnesses.

HARRISON TAYLOR CRONK.

Witnesses:
 ROSIE ISAACS,
 JOS. ISAACS.

Copies of this patent may be obtained for five cents each, by addressing the "Commissioner of Patents, Washington, D. C."